United States Patent
Perry et al.

(10) Patent No.: US 7,302,964 B1
(45) Date of Patent: Dec. 4, 2007

(54) HOUSING FOR A LIQUID SEAL VACUUM AND PRESSURE RELIEF VALVE APPARATUS

(75) Inventors: Paul D. Perry, Ontario (CA); Andre Veinotte, Ontario (CA)

(73) Assignee: Siemens VDO Automotive Canada Inc., Chatham (CA)

(*) Notice: Subject to any disclaimer, the term of this patent is extended or adjusted under 35 U.S.C. 154(b) by 191 days.

(21) Appl. No.: 10/821,179

(22) Filed: Apr. 9, 2004

Related U.S. Application Data

(63) Continuation-in-part of application No. 10/817,521, filed on Apr. 5, 2004, now abandoned, and a continuation-in-part of application No. 10/817,522, filed on Apr. 5, 2004, now Pat. No. 6,889,669.

(51) Int. Cl.
*F16K 13/00* (2006.01)

(52) U.S. Cl. .................... 137/254; 137/558

(58) Field of Classification Search ............. 137/557, 137/558, 254; 73/301, 749; 123/198 D, 123/520, 518, 519
See application file for complete search history.

(56) References Cited

U.S. PATENT DOCUMENTS

| | | | | |
|---|---|---|---|---|
| 1,874,727 A | * | 8/1932 | Wiggins et al. | 137/254 |
| 2,575,574 A | * | 11/1951 | Withrow et al. | 137/251.1 |
| 2,929,335 A | * | 3/1960 | Seiler | 417/437 |
| 4,362,130 A | * | 12/1982 | Robinson | 123/1 A |
| 4,423,638 A | * | 1/1984 | Tward | 73/749 |
| 6,199,574 B1 | * | 3/2001 | Harris | 137/199 |
| 6,386,222 B1 | * | 5/2002 | Harris | 137/199 |
| 6,973,938 B2 | * | 12/2005 | Mitchell | 137/247.35 |

OTHER PUBLICATIONS

U.S. Appl. No. 10/821,178, filed Apr. 9, 2004, Perry et al., Liquid for a Valve Apparatus.
U.S. Appl. No. 10/817,522, filed Apr. 5, 2004, Perry et al., System and Method of Managing Pressure in a Fuel System.
U.S. Appl. No. 10/817,521, filed Apr. 5, 2004, Perry et al., Valve Apparatus.

* cited by examiner

*Primary Examiner*—Eric Keasel
*Assistant Examiner*—Craig Schneider

(57) ABSTRACT

A housing and a method of using a liquid for controlling vapor flow through a valve apparatus between a canister and atmospheric conditions. The housing includes a container and a first partition that projects from the housing into the liquid and divides the vapor chamber into first and second vapor sub-chambers. A second partition projects from the container into the first vapor sub-chamber. And a third partition projects from the container into the second vapor sub-chamber. The housing contains the liquid in an upright arrangement of the valve apparatus, and prevents the liquid from flowing out of the container in a non-upright arrangement of the valve apparatus.

14 Claims, 6 Drawing Sheets

HOUSING FOR A LIQUID SEAL VACUUM AND PRESSURE RELIEF VALVE APPARATUS

CROSS REFERENCE TO RELATED APPLICATIONS

This application is a continuation-in-part of U.S. patent application Ser. No. 10/817,521, filed Apr. 5, 2004 now abandoned, entitled "Valve Apparatus," the contents of which is incorporated by reference herein in its entirety, and is a continuation-in-part of U.S. patent application Ser. No. 10/817,522, filed Apr. 5, 2004, entitled "System and Method of Managing Pressure in a Fuel System," now U.S. Pat. No. 6,889,669, issued May 10, 2005, the contents of which is incorporated by reference herein in its entirety.

A related co-pending application filed concurrently herewith is identified as "Liquid for a Valve Apparatus" U.S. application Ser. No. 10/821,178), and is incorporated by reference herein in its entirety.

FIELD OF THE INVENTION

A fuel vapor pressure management apparatus that manages pressure and detects leaks in a fuel system. In particular, a fuel vapor pressure management apparatus using a liquid seal valve that vents positive pressure, vents excess negative pressure, and uses evaporative natural vacuum to perform a leak diagnostic.

BACKGROUND OF THE INVENTION

A known fuel system for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

In such known fuel systems, excess fuel vapor can accumulate immediately after engine shutdown, thereby creating a positive pressure in the fuel vapor pressure management system. Thereafter, a vacuum in the fuel vapor pressure management system can result from natural system cooling after the engine has been turned off. Excess negative or positive pressure in closed fuel systems can occur under some atmospheric and operating conditions, thereby causing stress on components of these fuel systems.

An automotive on-board diagnostic (OBDII) can perform a leak detection test to determine if there is a leak in the fuel vapor pressure management system, which includes the fuel tank head space, the canister that collects volatile fuel vapors from the head-space, a purge valve and any associated hoses. A vacuum sensing function can perform the leak detection diagnostic. For example, a pressure/vacuum sensor or switch will allow the engine computer to monitor the vacuum that is caused by natural system cooling after the engine has been turned off, and thereby perform the leak detection diagnostic.

A vacuum relief function can provide fail-safe operation of the purge flow system, when the engine is ON, and guarantee that vacuum levels in the fuel tank do not endanger the integrity of the tank, when the engine is OFF. In general, the vacuum relief function should only allow flow at a pressure level below the vacuum sensor level.

A pressure relief function is desirable in order to "blow-off" the positive pressure due to excessive fuel vapor in the fuel vapor pressure management system immediately after engine shutdown. This can facilitate, e.g., expedite, the creation of the vacuum that is caused by the natural system cooling. Another benefit of the pressure relief function is to allow air to exit the tank at high flow rates during tank refueling. This function is commonly known as Onboard Refueling Vapor Recovery (ORVR). In general, the pressure relief function should be at a very low-pressure level in order to minimize the backpressure during refueling, and to limit excess pressure in a hot system.

SUMMARY OF THE INVENTION

The present invention provides a housing for a valve apparatus, which includes a liquid that controls vapor flow between a canister and atmospheric conditions. The housing includes a container and first, second and third partitions. The container defines a vapor chamber portion and a vapor flow control portion. The vapor flow control portion holds the liquid, and the vapor chamber portion is positioned above the vapor flow control portion in an upright arrangement of the valve apparatus. The first partition projects from the container into the liquid in the vapor flow control portion of the container, and divides the vapor chamber into first and second vapor sub-chambers. The first vapor sub-chamber is in vapor communication with the canister, and the second vapor sub-chamber is in vapor communication with the atmospheric conditions. The second partition projects from the container into the first vapor sub-chamber. And the third partition projects from the container into the second vapor sub-chamber.

The present invention also provides a method of using a liquid for controlling vapor flow through a valve apparatus between a canister and atmospheric conditions. The method includes defining a vapor flow path through a housing containing the liquid. The vapor flow path extends between first and second ports in the housing and passes through the liquid. The housing contains the liquid in a first reservoir in an upright arrangement of the valve apparatus. And the method includes preventing the liquid from flowing out of the first and second ports in a non-upright arrangement of the valve apparatus.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of a liquid, e.g., fuel, in the enclosure. In the case of a fuel tank for volatile fuels, e.g., gasoline, vapors from the volatile fuel may be present in the headspace of the fuel tank.

Figure 1:
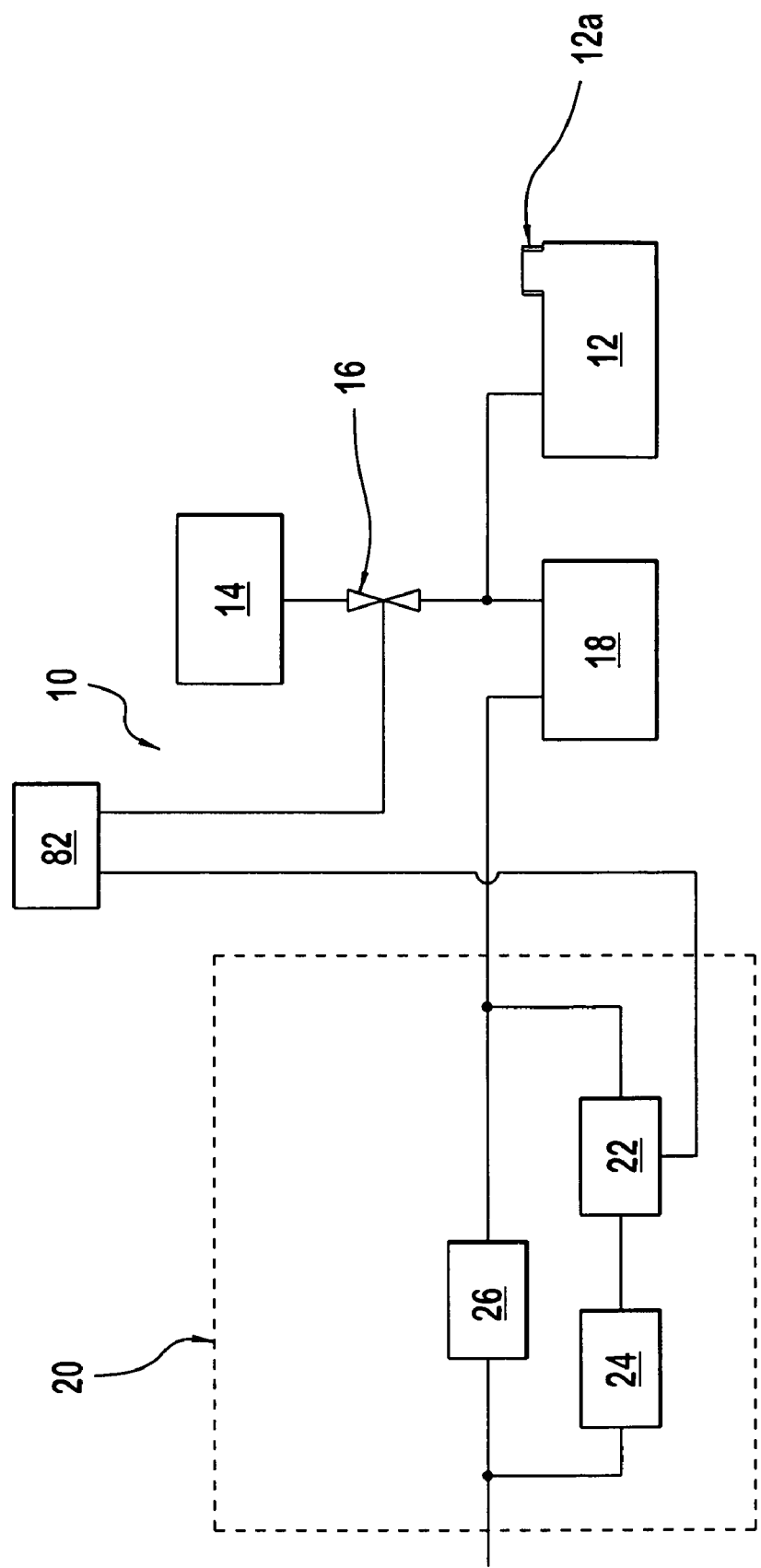
FIG. 1 is a schematic illustration of a fuel system that includes a fuel vapor pressure management apparatus in accordance with the detailed description of certain preferred embodiments.

Referring to FIG. 1, a fuel system 10, e.g., for an engine (not shown), includes a fuel tank 12, a vacuum source 14 such as an intake manifold of the engine, a purge valve 16, a fuel vapor collection canister 18 (e.g., a charcoal canister), and a fuel vapor pressure management apparatus 20.

The fuel vapor pressure management apparatus 20 performs a plurality of functions including signaling 22 that a first predetermined pressure (vacuum) level exists, "vacuum relief" or relieving negative pressure 24 at a value below the first predetermined pressure level, and "pressure blow-off" or relieving positive pressure 26 above a second pressure level.

Other functions are also possible. For example, the fuel vapor pressure management apparatus 20 can be used as a vacuum regulator, and in connection with the operation of the purge valve 16 and an algorithm, can perform large leak detection on the fuel system 10. Such large leak detection could be used to evaluate situations such as when a refueling cap 12a is not replaced on the fuel tank 12. The fuel pressure management apparatus 20 and purge valve 16 communicate with an automotive on-board diagnostic (OBDII) engine computer 82.

It is understood that volatile liquid fuels, e.g., gasoline, can evaporate under certain conditions, e.g., rising ambient temperature, thereby generating fuel vapor. In the course of cooling that is experienced by the fuel system 10, e.g., after the engine is turned off, a vacuum is naturally created by cooling the fuel vapor and air, such as in the headspace of the fuel tank 12 and in the fuel vapor collection canister 18. According to the present description, the existence of a vacuum at the first predetermined pressure level indicates that the integrity of the fuel system 10 is satisfactory. Thus, signaling 22 is used to indicate the integrity of the fuel system 10, i.e., that there are no appreciable leaks. Subsequently, the vacuum relief 24 at a pressure level below the first predetermined pressure level can protect the fuel tank 12, e.g., can prevent structural distortion as a result of stress caused by excess vacuum in the fuel system 10.

After the engine is turned off, the pressure blow-off 26 allows excess pressure due to fuel evaporation to be vented, and thereby expedite the onset of vacuum generation that subsequently occurs during cooling. The pressure blow-off 26 allows air within the fuel system 10 to be released while fuel vapor is retained. Similarly, in the course of refueling the fuel tank 12, the pressure blow-off 26 allows air to exit the fuel tank 12 at a high rate of flow.

At least two advantages are achieved in accordance with a system including the fuel vapor pressure management apparatus 20. First, a leak detection diagnostic can be performed on fuel tanks of all sizes, including large volume fuel tanks, e.g., 100 gallons or more. Second, the fuel vapor pressure management apparatus 20 is compatible with a number of different types of the purge valves, including digital and proportional purge valves.

Figure 2A:
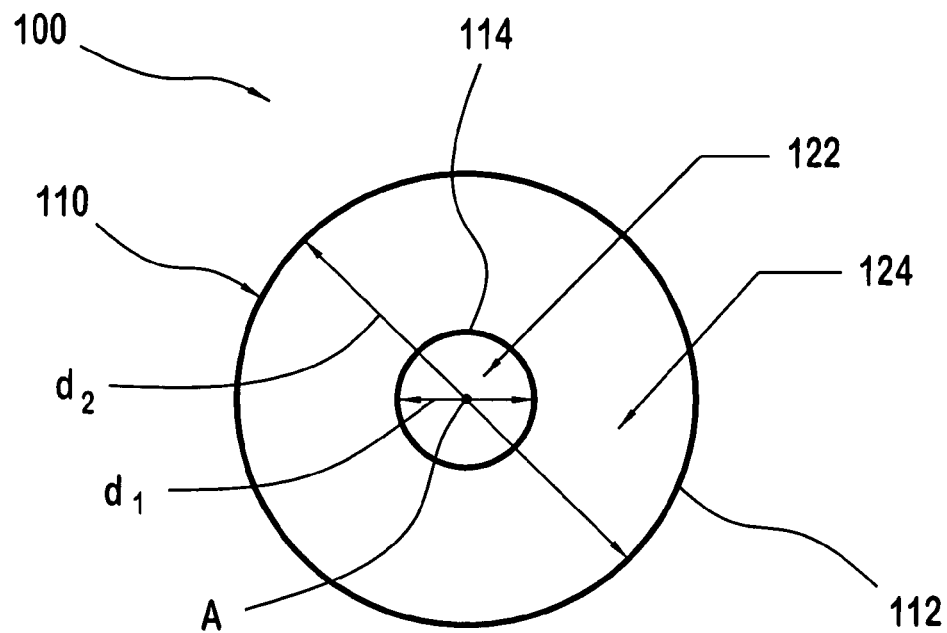
FIG. 2A is a top view of a model illustrating the operating principles of a vapor pressure management apparatus according to the present invention.
Figure 2B:
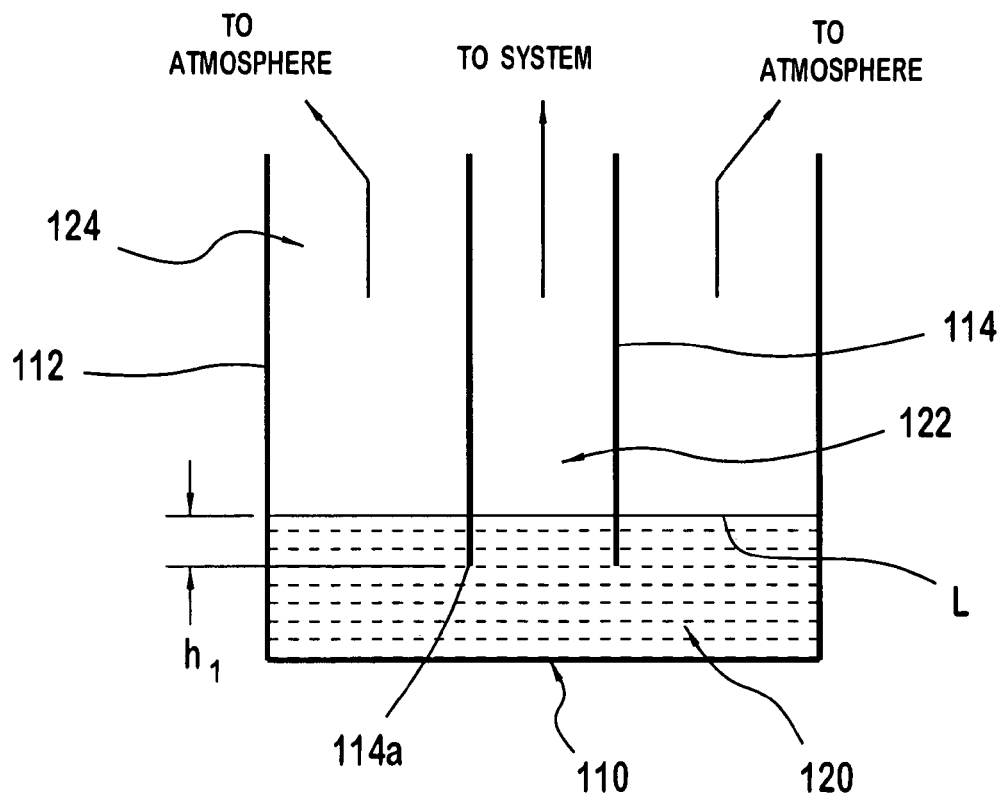
FIG. 2B is an elevation view showing the resting state of the model shown in FIG. 2A.

Referring to FIGS. 2A and 2B, a model 100 of the fuel vapor pressure management apparatus 20 will now be described. The model relies on the principal of a standing column of liquid. Consider a cylindrical vessel 110 consisting of a container 112 with a freestanding cylindrical tube 114. The vessel 110 is partially filled with liquid 120 that separates the vessel 110 into a first chamber 122 and a second chamber 124. The first chamber is defined within the cylindrical tube 114, and the second chamber 124 is defined between the wall of the container 112 and the cylindrical tube 114. As shown in FIG. 2A, the first chamber 122 is circular and the second chamber 124 is annular. The shapes of the chambers 122, 124 in the model 100 may alternatively be defined by irregular or regular shapes other than circles, and may or may not share a common central axis A. The operation of this model will now be described.

FIG. 2B shows a resting state of the model 100. In the resting state, the liquid 120 is at a level L, with respect to the bottom of the vessel 110, that is the same in both the first and second chambers 122, 124. According to the model 100 shown in FIGS. 2A and 2B, the cylindrical tube 114 has an inside diameter d1 and the container 112 has an inside diameter d2. The vessel 110 is filled with the liquid 120 so that the cylindrical tube 114 is immersed to a depth of h1. The volume of liquid below the cylindrical tube 114 is irrelevant. In the resting state, the model 100 will not allow vapor, e.g., air, to pass between the first and second chambers 122, 124. In effect, the liquid 120 contiguously engaging the bottom end 114a of the cylindrical tube 114 creates a perfect seal. Flow will only occur through the model 100, i.e., between the first and second chambers 122, 124, when a pressure or vacuum threshold is achieved as explained below.

Figure 3:
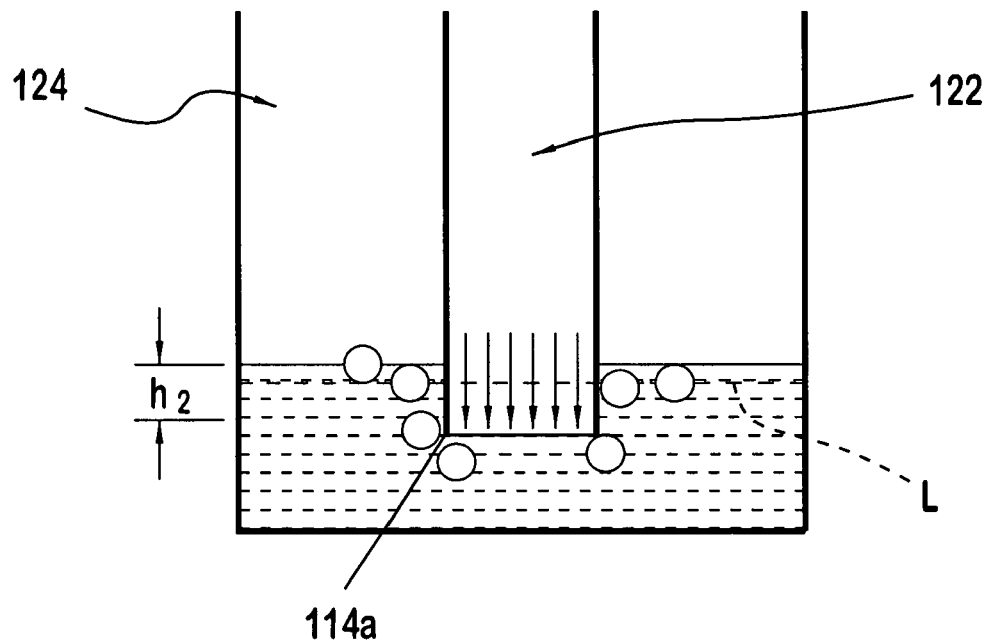
FIG. 3 is an elevation view showing a first operating state of the model shown in FIG. 2A.

Referring now to FIG. 3, the pressure relief mode of the model 100 is enabled, when a positive pressure differential exists in the first chamber 122 relative to the second chamber 124. If a system to which the model 100 is connected, e.g., the fuel system 10, applies pressure to the first chamber 122, the column of liquid 120 within the cylindrical tube 114 is displaced until vapor escapes under the bottom end 114*a* into the second chamber 124. As positive pressure increases, the liquid 120 will be displaced from the cylindrical tube 114 into the annular volume of between the container 112 and the cylindrical tube 114. The start to flow pressure is governed by the head, h2. The volume of the liquid 120 inside the cylindrical tube 114 in the resting state can be calculated as:

$$h_1 \times \pi (d_1/2)^2 \text{ or } h_1 \times A_1$$

where $A_1$ is the cross-sectional area inside the cylindrical tube 114. When the positive pressure differential reaches a level where the entire volume of the liquid 120 inside the cylindrical tube 114 has been displaced, vapor in the form of bubbles, as depicted in FIG. 3, will be begin to escape from the first chamber 122. The level at which this pressure relief flow will begin to occur can be calculated by:

$$h_2 = h_1 + ((h_1 \times A_1)/A_2)$$

The pressure differential h2 at which pressure relief occurs is dependent on the specific gravity of the liquid. As can be seen by this formula, the pressure relief point h2 can be made significantly lower by increasing the difference in area between A1 and A2.

Figure 4:
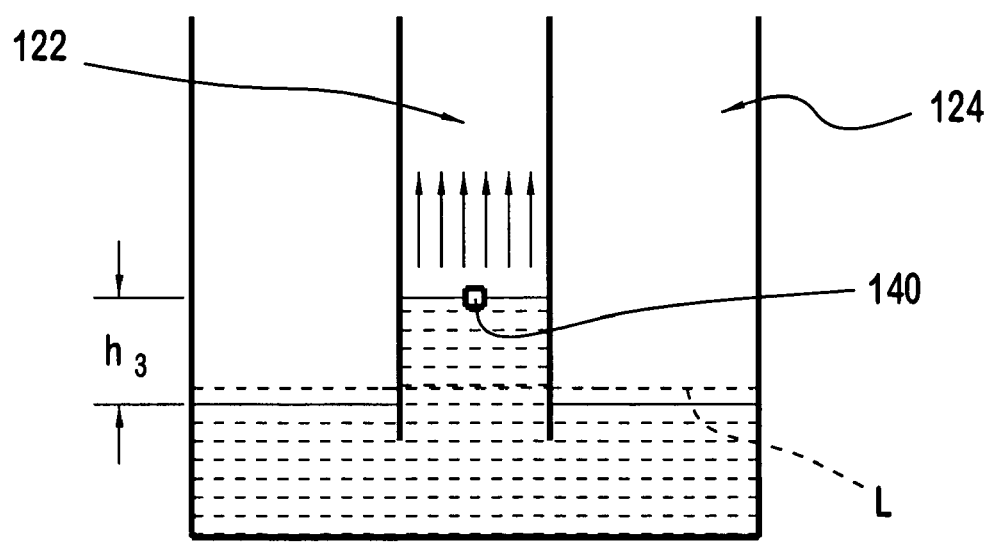
FIG. 4 is an elevation view showing a second operating state of the model shown in FIG. 2A.

Vacuum sensing is depicted in FIG. 4. An appropriate liquid level sensor 140 has been placed approximate halfway up the cylindrical tube 114. The level sensor 140 is active when the vehicle engine is OFF. If the system to which the model 100 is connected, e.g., the fuel system 10, applies vacuum to the first chamber 122, the column of liquid 120 within the cylindrical tube 114 is raised. The column of the liquid 120 can be detected by a number of methods (float, thermistor, capacitive, optical, conductive, etc.) when the liquid head reaches the detection threshold, h3. The sensor 140 will signal a passing diagnostic when a negative pressure differential that exists in the first chamber 122 relative to the second chamber 124 draws the liquid 120 up to the point of touching or triggering the level sensor 140. The vacuum sensing level or calibration is related to head differential between the first and second chambers 122, 124, and to the specific gravity of the liquid 120. For example, at a given position of the level sensor 140, the vacuum sense calibration will increase with increasing specific gravity.

Figure 5:
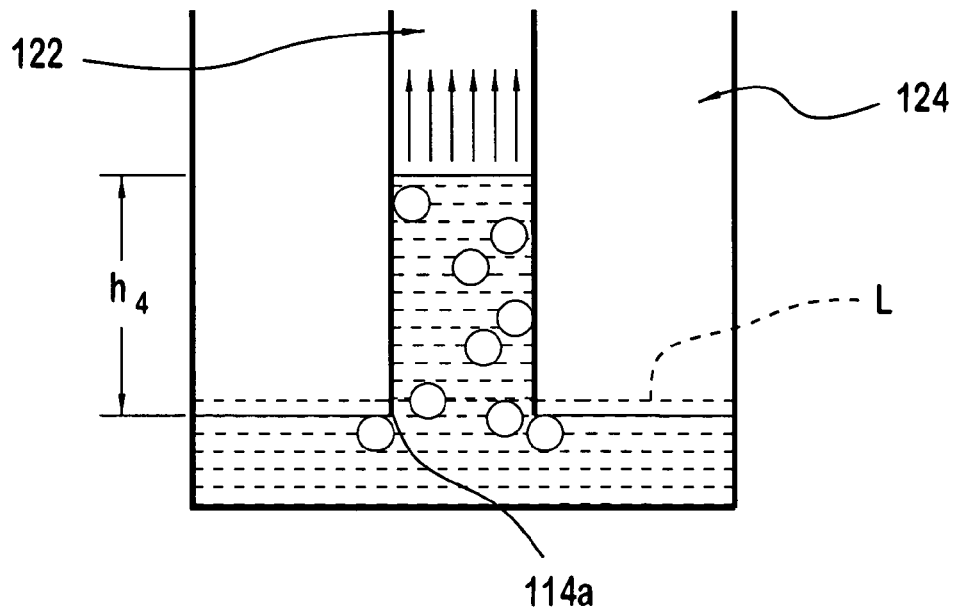
FIG. 5 is an elevation view showing a third operating state of the model shown in FIG. 2A.

Vacuum relief is depicted in FIG. 5. As vacuum continues to raise the column of the liquid 120 in the first chamber 120 to a higher level than in FIG. 4, the liquid 120 will be displaced from the second chamber 124, under the bottom end 114*a* of the cylindrical tube 114, and into the first chamber 122. When the negative pressure differential reaches a level where the entire volume of the liquid 120 outside the cylindrical tube 114 has been displaced, i.e., to the bottom 114*a* of the cylindrical tube 114, vapor in the form of bubbles, as depicted in FIG. 5, will begin to escape from the second chamber 124, under the bottom end 114*a* of the cylindrical tube 114, and into the first chamber 122. The level at which this vacuum relief flow will begin to occur can be calculate by:

$$h_4 = h_1 + ((h_1 \times A_2)/A_1)$$

Figure 6:
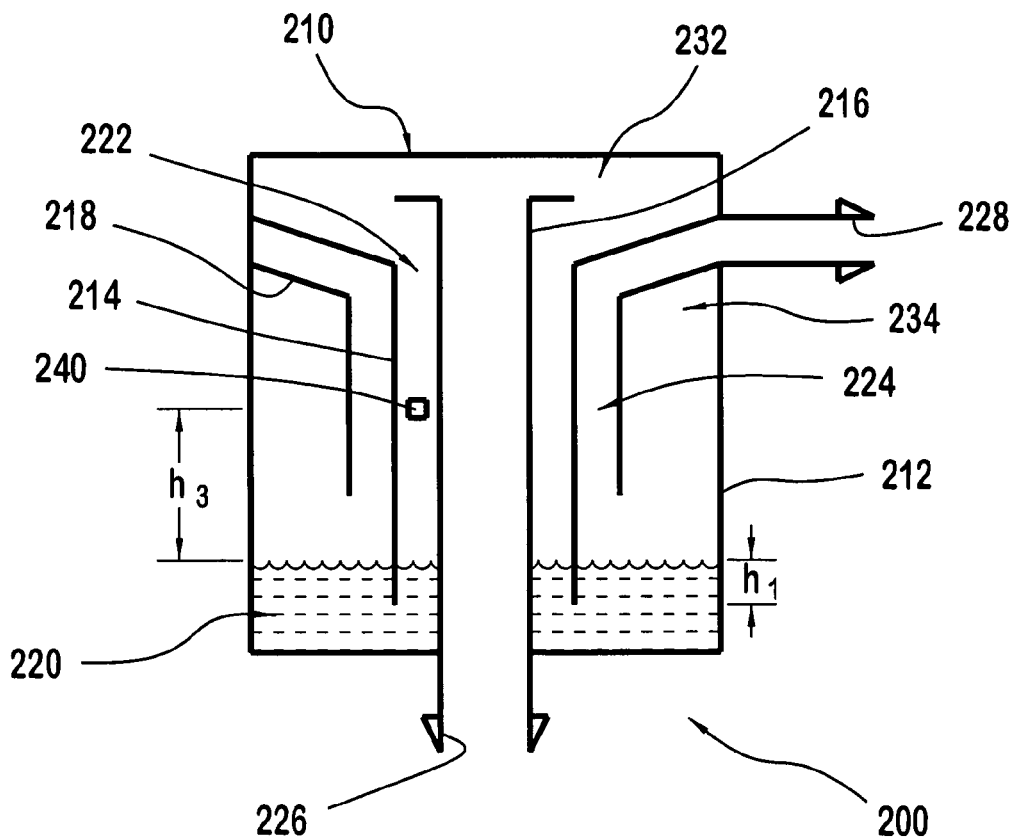
FIG. 6 is a schematic illustration of a vapor pressure management apparatus according to the present invention.

FIG. 6 schematically illustrates a vapor pressure management apparatus 200 according to the present invention. Features having characteristics and functions that are similar to those of the model 100 are indicated with reference numerals that are incremented by one-hundred. Thus, for example, sensor 240 of the vapor pressure management apparatus 200 has characteristics and functions that are similar to sensor 140 of the model 100. FIG. 6 also illustrates several additional features that will now be described.

The vessel 210 encloses the liquid 220 so as to contain the liquid 220 regardless of the orientation of the vapor pressure management apparatus 200. The liquid provides a means for controlling the direction of vapor flow, without a resilient element and without an electric element. Containment of the liquid 220 is in large part achieved by an inner partition 216 and an outer partition 218. The inner partition 216 establishes fluid communication path between a vapor port 226 and the first chamber 222, and the outer partition 218 establishes a fluid communication path between a vent port 228 and the second chamber 224. A first reservoir 232 is partially defined by the inner partition and the container 212, and a second reservoir 234 is partially defined by the outer partition 218 and the container 212. The first and second reservoirs 232, 234 provide holding volumes for any of the liquid 220 that may be displaced as a consequence of tipping or turning over the vessel 210. And at such time as the vessel is returned to its upright condition, the liquid 210 that was held in the first and second reservoirs 232, 234 is returned to the first and second chambers 222, 224 without being permitted to flow out either the vapor port 226 or the vent port 228. In this way, the liquid 220 that is placed inside the vessel 210 is contained in the vessel 210 regardless of changes in orientation of the vapor pressure management apparatus 200.

Figure 7:
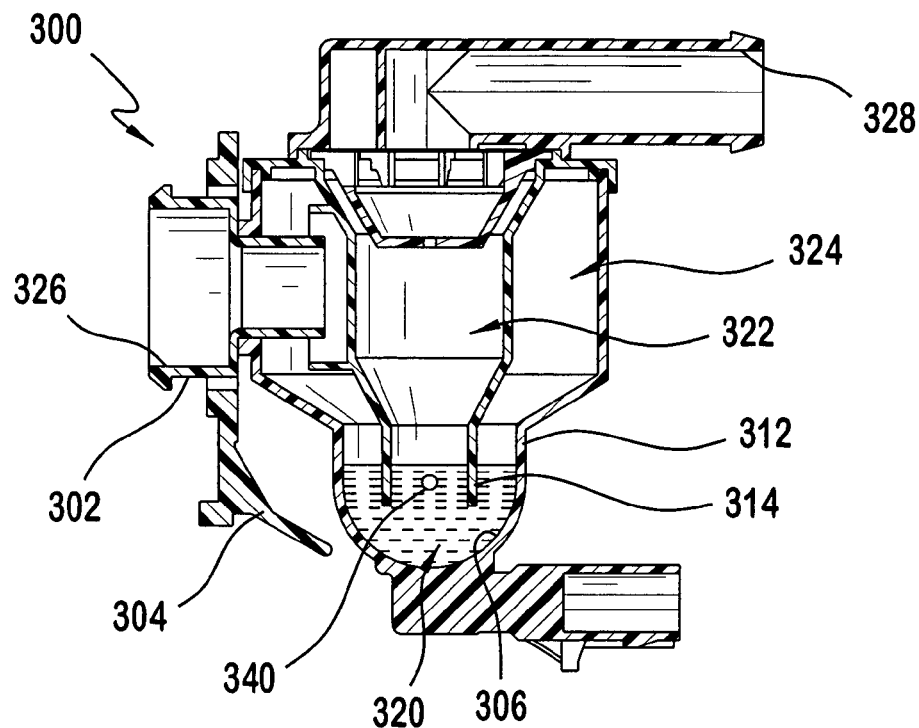
FIG. 7 is a cross-section of a first embodiment of a vapor pressure management apparatus according to the present invention.

Referring now to FIG. 7, there is shown a fuel vapor pressure management apparatus 300 according to a first preferred embodiment. Again, features having characteristics and functions that are similar to those of the model 100 or the schematic illustration of the vapor pressure management apparatus 200 are indicated with reference numerals that are incremented by two-hundred and one-hundred, respectively. Thus, for example, sensor 340 of the fuel vapor pressure management apparatus 300 has characteristics and functions that are similar to sensor 140 of the model 100, and to sensor 240 of the vapor pressure management apparatus 200. FIG. 7 also illustrates several additional features that will now be described.

Vapor port 326 includes a fitting that is particularly suited to being mounted on the fuel vapor collection canister 18 of the fuel system 10 (FIG. 1). The fuel vapor pressure management apparatus 300 includes a container 312 that can be mounted directly to the fuel vapor collection canister 18 by a "bayonet" style attachment 302. A seal (not shown) can be interposed between the fuel vapor collection canister 18 and the fuel vapor pressure management apparatus 300 so as to provide a fluid tight connection. The bayonet style attachment 302, in combination with a snap finger 304, allows the fuel vapor pressure management apparatus 300 to be readily serviced in the field. Of course, different styles of attachments between the fuel vapor pressure management apparatus 300 and the fuel vapor collection canister 18 can be substituted for the illustrated bayonet attachment 302. Examples of different attachments include a threaded attachment, and an interlocking telescopic attachment. Alternatively, the fuel vapor collection canister 18 and the container 312 can be bonded together (e.g., using an adhesive).

A semi-spherical portion 306 of container 312 contains the liquid 320 in the resting state of the fuel vapor pressure management apparatus 300. The inventors of the present invention have discovered that the semi-spherical shaped portion 306 reduces the impact of tilting from the vertical on the calibration of the fuel vapor pressure management apparatus 300.

Figure 8:
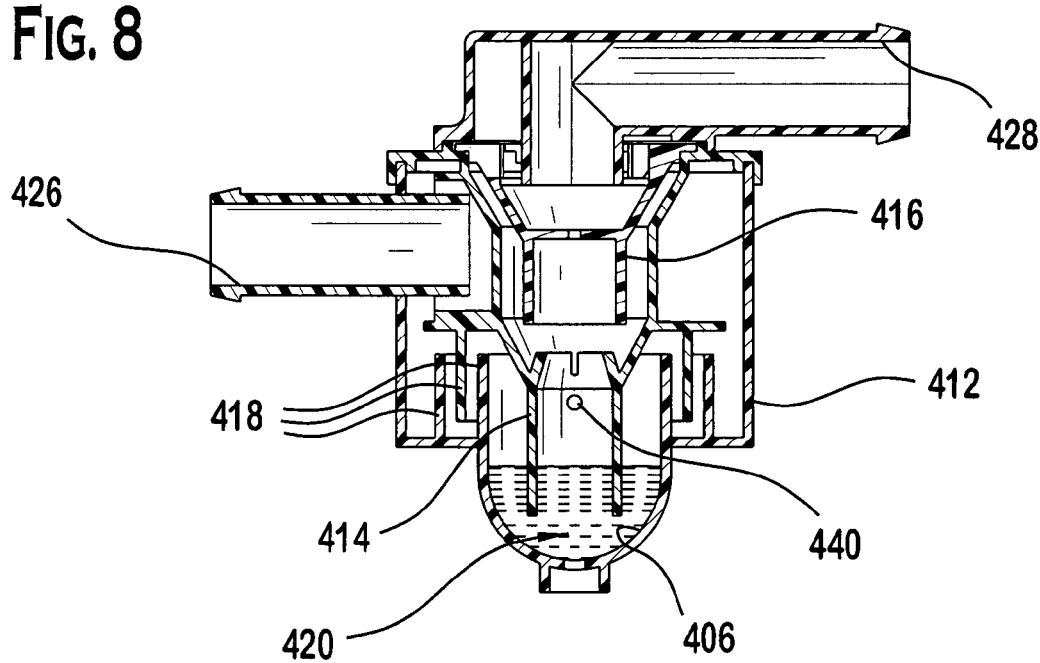
FIG. 8 is a cross-section of a second embodiment of a vapor pressure management apparatus according to the present invention.
Figure 9A:
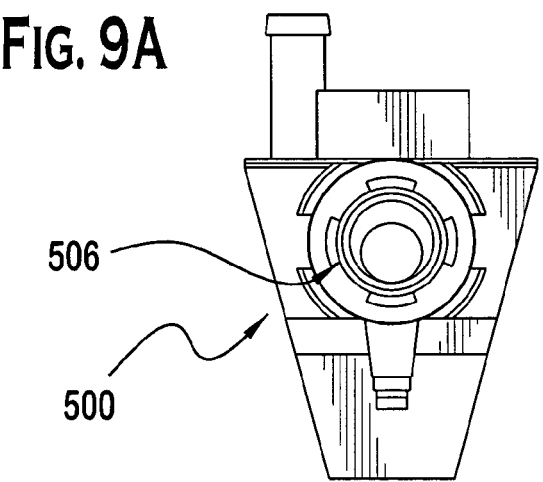
FIGS. 9A, 9B and 9C are plan views of a third embodiment of a vapor pressure management apparatus according to the present invention.
Figure 9B:
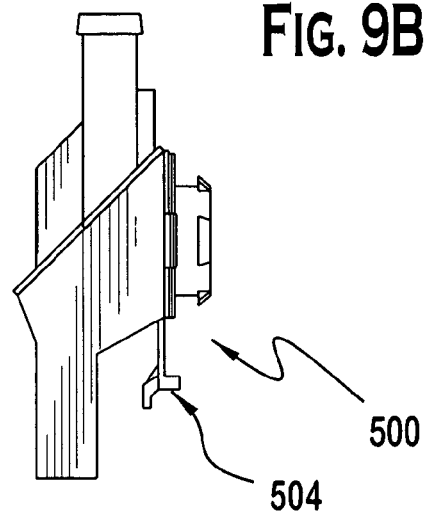
Figure 9C:
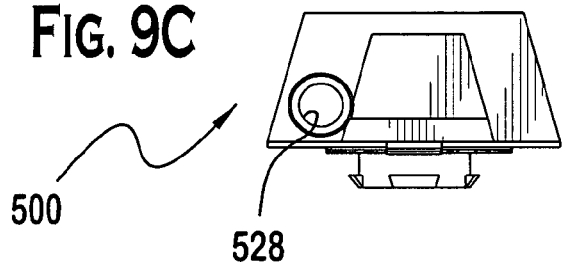
Figure 9D:
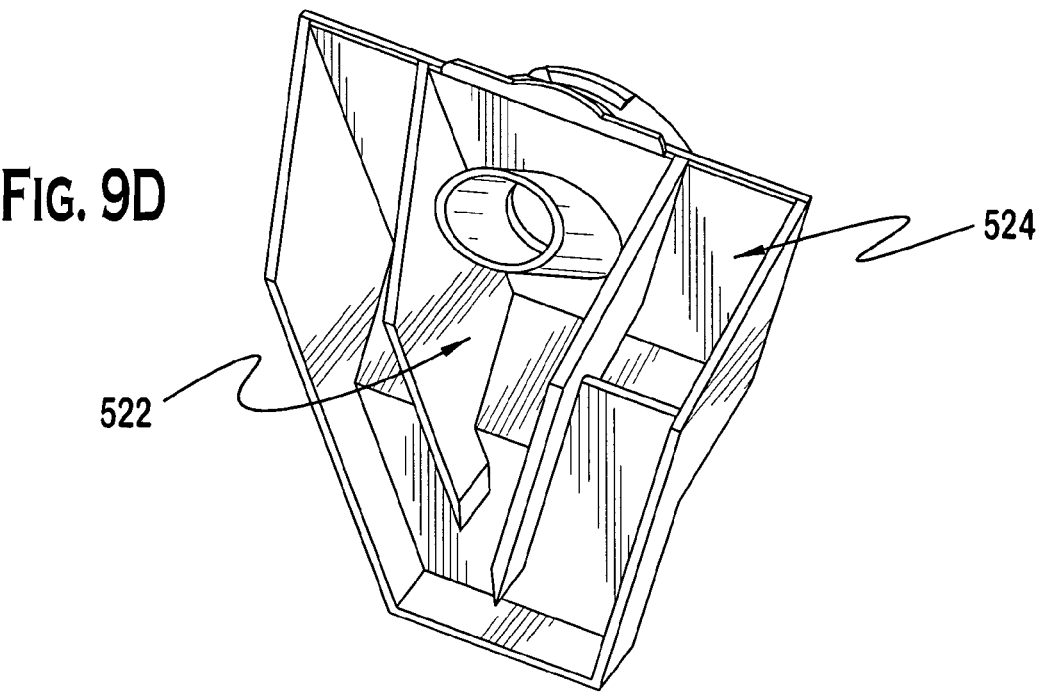
FIG. 9D is an isometric view of the third embodiment of a vapor pressure management apparatus shown in FIGS. 9A, 9B and 9C.

FIG. 8 shows an in-line style of connecting the fuel vapor pressure management apparatus 400 with the fuel vapor collection canister 18. Again, features having characteristics and functions that are similar to those of the model 100, the schematic illustration of the vapor pressure management apparatus 200, and the fuel vapor pressure management apparatus 300 are indicated with reference numerals that are incremented by three-hundred, two-hundred and one-hundred, respectively. The in-line style of connection includes a nipple 426 that can be interconnected with the fuel vapor collection canister 18 via an intermediate member such as a rigid pipe or a flexible hose (not shown).

FIGS. 9A-9D show a fuel vapor pressure management apparatus 500 according to a third preferred embodiment of the present invention. Again, features having characteristics and functions that are similar to those of the model 100, the schematic illustration of the vapor pressure management apparatus 200, and the fuel vapor pressure management apparatuses 300 and 400 are indicated with reference numerals that are incremented by four-hundred, three-hundred, two-hundred and one-hundred, respectively. The fuel vapor pressure management apparatus 500 includes a bayonet-style attachment 506 for coupling to the fuel vapor collection canister 18. Notably, the fuel vapor pressure management apparatus 500 uses non-circular walls to separate and partition the first and second chambers 522, 524, and uses fewer components so that the cost of manufacturing is reduced.

With regard to the liquid 120, 220, 320, 420, 520, increasing the specific gravity of the liquid will reduce the physical size of the device. For example, increasing the specific gravity of the liquid reduces the displacement (i.e., h4 in the case of vacuum relief) of the liquid column necessary to achieve the same vacuum level at the point of relief.

Preferably, the viscosity of the liquid 120, 220, 320, 420, 520 is heavy enough that the bursting bubbles to not spray liquid into the air stream to be carried away. Liquid traps may be used to capture and retain the liquid so as not to drain out of the container 112, 212, 312, 412, 512 if the vessel 110, 210, 310, 410, 510 is tilted or overturned. A liquid trap can include partitions, baffles, etc. that direct the flow of the liquid way from the ports. A, tortuous path can also be implemented to keep the liquid inside the vapor pressure management apparatus. Preferably, the viscosity remains fluid enough to enable the apparatus to operate at extreme low temperatures.

For the device to be viable over the life of a vehicle, the liquid needs have a very low evaporation rate and must not freeze into a solid until at least −40° Celsius. According to the present invention, a preferable liquid should possess the following properties:

Excellent oxidative and thermal stability

Low volatility and vapor pressure

Non-flammable and chemically inert

Excellent plastic and elastomer compatibility

Resistant to aggressive chemicals and solvents

Low evaporation is required so that that apparatus function can be maintained over a 15-year and 150,000-mile life of a vehicle. In addition, a low evaporation rate ensures that the liquid itself will not create stray airborne hydrocarbon molecules that could fail an evaporative emissions test. A preferable liquid will have a kinematic viscosity range of 75-600 centistokes throughout a temperature range of −40 to +100 degrees Celsius, and will have a near zero vapor pressure ($\sim 5 \times 10^{-9}$ torr at 100 degrees Celsius).

A synthetic oil, such as Fluorinated Polyether, is an example of an acceptable liquid. Preferably, the liquid may be Perfluoropolyether (PFPE), which has an acceptable viscosity and may be used in extreme temperature environments or in applications that require chemical, fuel, or solvent resistance.

The liquid may also include suspended carbon particles to act as an electrical conductor, or the liquid may include glass micro-spheres to thicken the liquid and prevent splashing and liquid carry-over. The liquid may also be a gel.

With regard to the sensor 140, 24, 340, 44, 540, the vacuum sensing 22 can be accomplished with a positive or negative temperature coefficient thermistor, a capacitive sensor, a float and a contact switch, a magnet and a reed switch, resistive/conductive oil, and many others. These devices can be used to sense the liquid level of the column in the first chamber. For example, the presence or absence of the liquid at a level can be sensed using a heated thermistor that dissipates more heat in liquid than in air, or with a capacitive sensor inasmuch as oil and air have very different dielectric constants. Further, sensors that measure that directly measure the pressure differential that causes liquid displacement can also be used in conjunction with the vacuum relief and pressure blow-off the pressure differentials between the first and second chambers.

Numerous advantages are achieved in accordance with the vapor pressure management apparatus according to the present invention. These advantages include providing a leak detection diagnostic using vacuum monitoring during natural cooling, e.g., after the engine is turned off, providing relief for vacuum below the first predetermined pressure level, and providing relief for positive pressure above the second predetermined pressure level. Additionally, the vacuum relief 24 provides fail-safe purging of the canister 18, and the relieving pressure 26 regulates the pressure in the fuel tank 12 during any situation in which the engine is turned off, thereby limiting the amount of positive pressure in the fuel tank 12 and allowing the cool-down vacuum effect to occur sooner.

According to the present invention, the liquid has the ability to wet-out on the walls and effectively lower the volume that has to be displaced, and to lower the back-pressure because the liquid clings to the walls and out of the path of airflow. The liquid also acts as a wet filter to remove debris from the incoming air stream.

The present invention advantageously includes a semi-spherical shaped lower housing that reduces the impact of tilt angle on calibration. A spill-proof housing uses tortuous paths and reservoirs to contain liquid in the event that the part is inverted, and then the liquid returns to its original location when part is set upright. Further, a reservoir of unused liquid can be provided to top up the liquid level if there is a liquid loss due to evaporation or liquid carry-over. And if liquid becomes contaminated or destroyed, a service procedure could be created to rejuvenate the part by extracting the used liquid and inject a replacement amount of new liquid.

It is also possible according to the present invention to take advantage of the meniscus effect on the cylindrical tube end. This will tend to create a higher than expected level of pressure or vacuum relief. Also, the meniscus effect can be used to make the device smaller than expected.

According to the present invention, installation options include in-line and canister mounted variations. The vapor pressure management apparatuses according to the present invention also inherently provide zero vacuum leakage, allow positive and negative pressure relief values to be designed by geometry, presents no mechanical moving parts and thus there is no wear, no filtration is required, reduced durability testing, no calibration is required, and a very low parts count to ease assembly and reduced manufacturing costs.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A housing for a valve apparatus including a liquid controlling vapor flow between a canister and atmospheric conditions, the housing comprising:
   a container defining a vapor chamber portion and a vapor flow control portion, the vapor flow control portion holding the liquid, and the vapor chamber portion being positioned above the vapor flow control portion in an upright arrangement of the valve apparatus;
   a first partition projecting from the container into the liquid in the vapor flow control portion of the container, the first partition dividing the vapor chamber into first and second vapor sub-chambers, the first vapor sub-chamber being in vapor communication with the canister, and
   the second vapor sub-chamber being in vapor communication with the atmospheric conditions;
   a second partition projecting from the container into the first vapor sub-chamber; and
   a third partition projecting from the container into the second vapor sub-chamber;
   the second and third partitions substantially preventing outflow of the liquid from the container in an inverted arrangement of the valve apparatus.

2. The housing according to claim 1, further comprising:
   a first port penetrating the container and providing vapor communication between the canister and the first vapor sub-chamber; and
   a second port penetrating the container and providing vapor communication between the atmospheric conditions and the second vapor sub-chamber.

3. The housing according to claim 2, wherein the first and second partitions define a first passage providing fluid communication between the first port and the first vapor sub-chamber, and the first and third partitions define a second passage providing fluid communication between the second port and the second vapor sub-chamber.

4. The housing according to claim 2, wherein the first partition comprises a first cylindrical tube surrounding an axis, and the container surrounds the first cylindrical tube.

5. The housing according to claim 4, wherein the first port is concentric with the axis, and the second port is offset from the axis.

6. The housing according to claim 4, wherein the second partition comprises a second cylindrical tube extending parallel to the axis and being disposed inside the first cylindrical tube, and the third partition comprises a third cylindrical tube extending parallel to the axis and being disposed outside the first cylindrical tube.

7. The housing according to claim 6, wherein the first partition comprises a first annular portion extending between the first cylindrical tube and the container; the second partition comprises a second annular portion extending from the second cylindrical tube, and the third partition comprises a third annular portion extending between the third cylindrical tube and the container.

8. The housing according to claim 1, wherein the container and the second partition define a first liquid reservoir, and the container and the third partition define a second liquid reservoir.

9. The housing according to claim 8, wherein the first and second liquid reservoirs contain the liquid in a non-upright arrangement of the valve apparatus.

10. The housing according to claim 9, wherein the non-upright arrangement comprises an inverted arrangement of the valve apparatus.

11. The housing according to claim 1, wherein the vapor flow control portion comprises a semi-spherical shape.

12. A housing for a valve apparatus including a liquid controlling vapor flow between a canister and atmospheric conditions, the housing comprising:
   a container defining a vapor chamber portion and a vapor flow control portion, the vapor flow control portion being semi-spherical and holding the liquid, and the vapor chamber portion being positioned above the vapor flow control portion in an upright arrangement of the valve apparatus;
   a first partition projecting from the container into the liquid in the vapor flow control portion of the container, the first partition dividing the vapor chamber into first and second vapor sub-chambers, the first vapor sub-chamber being in vapor communication with the canister, and
   the second vapor sub-chamber being in vapor communication with the atmospheric conditions;
   a second partition projecting from the container into the first vapor sub-chamber; and
   a third partition projecting from the container into the second vapor sub-chamber.

13. The housing according to claim 12, further comprising:
   a first port penetrating the container and providing vapor communication between the canister and the first vapor sub-chamber; and
   a second port penetrating the container and providing vapor communication between the atmospheric conditions and the second vapor sub-chamber.

14. The housing according to claim 13, wherein the first and second partitions define a first passage providing fluid communication between the first port and the first vapor sub-chamber, and the first and third partitions define a second passage providing fluid communication between the second port and the second vapor sub-chamber.

* * * * *